(12) United States Patent
Kaga et al.

(10) Patent No.: US 7,121,969 B2
(45) Date of Patent: Oct. 17, 2006

(54) ROLLER CHAIN

(75) Inventors: Arimasa Kaga, Osaka (JP); Kazuhiko Shimaya, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 532 days.

(21) Appl. No.: 10/723,869

(22) Filed: Nov. 26, 2003

(65) Prior Publication Data

US 2004/0171450 A1    Sep. 2, 2004

(30) Foreign Application Priority Data

Feb. 27, 2003    (JP) ............................. 2003-051625

(51) Int. Cl.
*F16G 13/06* (2006.01)
*F16G 13/02* (2006.01)

(52) U.S. Cl. ...................... 474/231; 474/230

(58) Field of Classification Search ........ 474/230–231, 474/146, 227–229; 59/4, 85
See application file for complete search history.

(56) References Cited

U.S. PATENT DOCUMENTS 3,011,356 A * 12/1961 Bowman ................ 474/230
3,054,300 A    9/1962 Bowman
3,448,629 A * 6/1969 Pfrank et al. ............ 474/148
4,117,738 A * 10/1978 McKeon ................. 474/228
4,143,512 A * 3/1979 Templin ..................... 59/85
5,382,199 A    1/1995 Ducharme
5,507,697 A * 4/1996 Ledvina et al. .......... 474/231

FOREIGN PATENT DOCUMENTS

GB    947669    1/1964

* cited by examiner

*Primary Examiner*—Marcus Charles
(74) *Attorney, Agent, or Firm*—Howson and Howson

(57) ABSTRACT

In a roller chain, the outside diameters D of the rollers and the outside diameters d of the pins extending through bushings on which the rollers are disposed satisfy the relationships $0.72P \leq D \leq 0.79P$ and $0.40P \leq d \leq 0.44P$ where P is the pitch of the roller chain. The height H of the inner plates of the chain satisfies the relationship $0.96P \leq H$. The elongation ratio of the chain is significantly reduced, and improvements in breaking strength of the pin and in the rotational fatigue of the chain are realized. Consequently wear resistance, strength, and endurance of the chain are significantly improved, making the chain suitable for use as a timing chain in an engine that rotates at high speed.

1 Claim, 4 Drawing Sheets

ROLLER CHAIN

FIELD OF THE INVENTION

This invention relates to roller chains, and more particularly to a roller chain of the kind used for power transmission in an internal combustion engine, or in a conveying mechanism or other industrial machine. The invention may be used, for example, in the camshaft timing drive mechanism of an automobile engine.

BACKGROUND OF THE INVENTION

Metal roller chains have recently come into increasing use as power transmission media, especially in automobiles, where higher loads, and the demand for high speed, maintenance-free, operation have caused the roller chain to displace the toothed belt.

As shown in FIGS. 5(a), 5(b) and 5(c), a conventional roller chain 500 comprises an inner link 520 (FIG. 5(b)) in which both ends of each of two cylindrical bushings 522 are fixed, by press-fitting, in bushing holes 526 in a pair of inner plates 524, and rollers 528 fit rotatably on the bushings 522. An outer link 540 (FIG. 5(c)) has two pins 542, which extend through the bushings and are similarly fixed, by press-fitting, in holes 546 in a pair of outer plates 544 disposed on the outsides of the pair of inner plates 524, as shown in FIG. 5(a).

From the standpoint of size balance, the roller chains most commonly used are "A type" roller chains, having the relationships $0.591 \leq D/P \leq 0.640$ and $0.281 \leq d/P \leq 0.377$, and "B type" roller chains, having the relationship $0.575 \leq D/P \leq 0.670$ and $0.288 \leq d/P \leq 0.389$, where D is the outside diameter of the roller, d is the outside diameter of the pin, and P is the pitch of the roller chain. (See JIS B1801).

The are two reasons for these limitations. When D/P is too high, the sprocket teeth engaging the roller chain are too narrow and insufficiently strong. On the other hand, when D/P is too low, the outside diameter d of the pins becomes too low, resulting in a reduction of the strength of the chain.

A B-type roller chain, designated a "06B" chain according to JIS B1801 (coincident with the ISO number) has been used commonly as a power transmission medium in an automobile engine. This chain has a pitch of 9.525 mm, an outside roller diameter of 6.35 mm, and an outside pin diameter of 3.28 mm, It has been reported that, when the above-mentioned conventional roller chains are used as timing chains in automobile engines in which high loads, for example 4 kN, are encountered, some of the roller chains do not exhibit the expected endurance. Therefore, enhancement of reliability of the engine and of the endurance of the roller chain, has become an urgent problem. As a result of continued study, we have found that the "elongation—wear resistance" of a roller chain is exceeded when a high speed engine applies an unexpectedly high load to the pins of the roller chain. The conventional ratio of the outside diameter D of a roller, to the pitch P, and the conventional ratio of outside diameter d of the pin to the pitch P (D/P and d/P), which were set in accordance with the conventional size balance, are not always the optimum values.

The general object of the invention is to solve the above-mentioned problems encountered in a conventional roller chain, and to provide a roller chain with enhanced wear resistance and strength, and particularly good endurance when the roller chain is used as a timing chain in an automobile engine which rotates at high speed.

SUMMARY OF THE INVENTION

The roller chain in accordance with the invention comprises alternately connected and overlapping inner and outer links. Each inner link comprises a pair of opposed inner plates, each inner plate having a pair of bushing holes, and a pair of bushings, each bushing being fixed in one bushing hole of one of said inner plates and in one bushing hole of the other of said inner plates. Each outer link comprises a pair of opposed outer plates, each outer plate having a pair of pin holes, and a pair of pins, each pin being fixed in one pin hole of one of said outer plates and in one pin hole of the other of said outer plates. The outer plates of each outer link are disposed in overlapping relation with, and on the outsides of, inner plates of adjacent inner links, and each pin of an outer link extends through, and is rotatable in, a bushing of an adjacent inner link. A roller is rotatably disposed on each bushing.

The outside diameter D of the roller and the outside diameter d of the pin satisfy the relationships $$0.72P \leq D \leq 0.79P \text{ and}$$

$$0.40P \leq d \leq 0.44P$$

where P is the pitch of the roller chain.

The height H of the inner plates satisfies the relationship $$0.96P \leq H.$$

When d/P is 0.40 or more, the strength of the pin is enhanced so that the likelihood of breakage of the pin under a high load, or during high-speed rotation, is reduced. On the other hand, when d/P exceeds 0.44, the wall thicknesses of the bushing and the roller become excessively small, which undesirably decreases the strength of the chain.

In order not to decrease the impact resistance of the bushing and the roller, the wall thickness of the bushing and the roller must be maintained. Thus, the value of D/P is chosen to satisfy the relationship $0.72 \leq D/P \leq 0.79$.

Since the value of d/P is set so that $0.40 \leq d/P \leq 0.44$, the diameter of the bushing becomes larger than that of a conventional bushing. Thus, the minimum cross-sectional dimension of the inner link, that is, the minimum distance between the periphery of the bushing hole the edge of the inner link plate, measured along a line intersecting the center of the bushing hole and extending perpendicular to the longitudinal direction of the chain, is decreased. Accordingly, the strength of the inner link is reduced. Therefore, the height H of the inner link, which in a conventional chain is about 86% of the chain pitch, is increased to at least 96% of the chain pitch.

When the relationships $0.72P \leq D \leq 0.79P$, $0.40P \leq d \leq 0.44P$, and, $0.96P \leq H$ are satisfied, the breaking strength of the pin is significantly enhanced and the roller chain is capable of operating smoothly over a long period of time. Additionally, the increase in the diameter of the pin increases the contact area between the pin and the bushing, and the contact stress on the pin and the bushing is decreased as a result. Wear of the pin and bushing, and resulting elongation of the chain, are suppressed, and continued proper engagement of the chain with its sprockets is realized. Furthermore, since the minimum cross-sectional dimension of the inner link is increased, stress concentration in the vicinity of the locations at which the bushings are press-fit to the inner link is avoided.

DETAILED DESCRIPTION OF THE PREFERRED EMBODIMENT

Figure 1A:
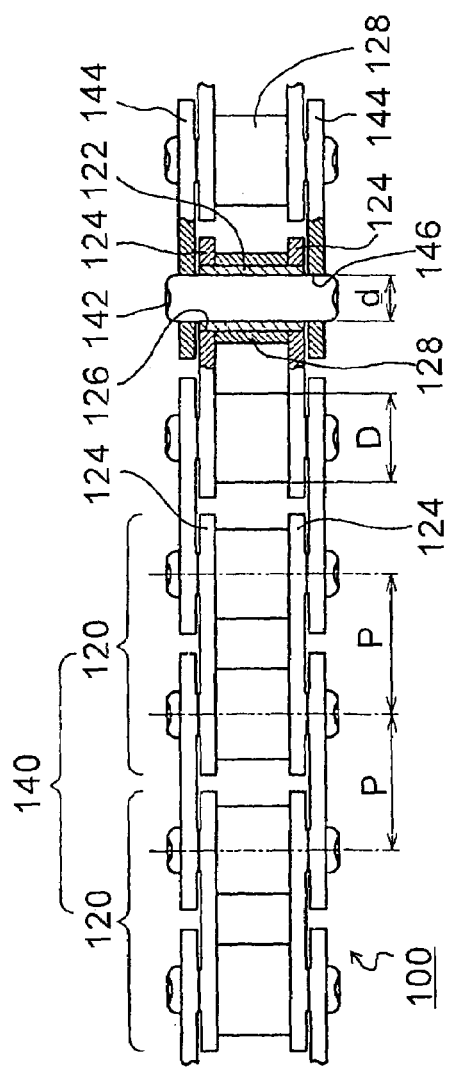
FIG. 1(a) is a plan view, partly in section, showing a portion of a roller chain in accordance with the invention.

FIG. 1(a) shows the roller chain 100 of the invention partly in section so that the interior structure can be seen. The roller chain comprises inner links 120 and outer links 140. In each inner link 120, both ends of each of two cylindrical bushings 122 are fixed in bushing holes 126 of a pair of inner plates 124 respectively, and a roller 128 fits rotatably on each bushing 122. Each outer link 140 comprises a pair of pins 142 and a pair of outer plates 144. Each of the pins extends through one of the bushings, and is rotatable therein. The ends of each pin 142 are fixed to pin holes 146 in the respective outer plates 144 of the outer link, and the outer plates 144 are disposed in overlapping relationship with the outsides of the inner plates 124.

Figure 1B:
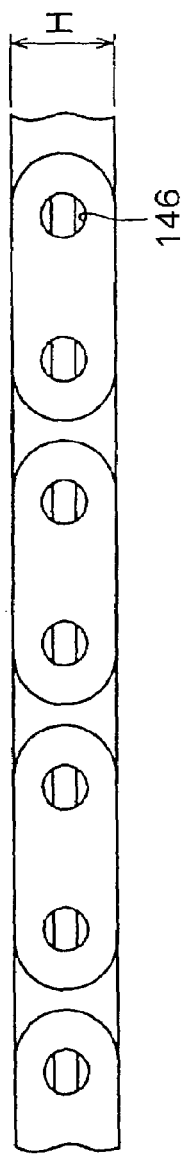
FIG. 1(b) is a side elevation of the chain portion shown in FIG. 1(a)

The sizes of the respective portions of the roller chain were set so that the outside diameter D of the roller and the outside diameter d of the pin satisfy the relationships $0.72P \leq D \leq 0.79P$, and $0.40P \leq d \leq 0.44P$, where P is the pitch of the roller chain. The height H of the inner plate, as shown in FIG. 1(b), satisfies the relationship $0.96P \leq H$.

In an example of a preferred embodiment of the invention, the outside diameter D of the roller was 6.25 mm, the outside diameter d of the pin was 3.50 mm, the pitch of the roller chain was 8.00 mm, and the height of the inner plate was 7.8 mm. That is, D/P=0.781, d/P=0.438 and H/P=0.978. These parameters satisfy the above relationships.

Figure 2:
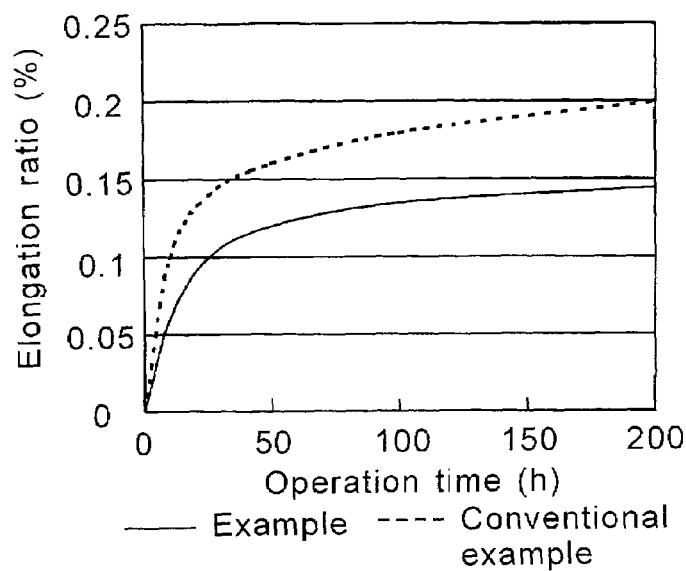
FIG. 2 is a graph showing the results of tests for elongation ratios, carried out on a roller chain in accordance with the invention and on a conventional roller chain.
Figure 3:
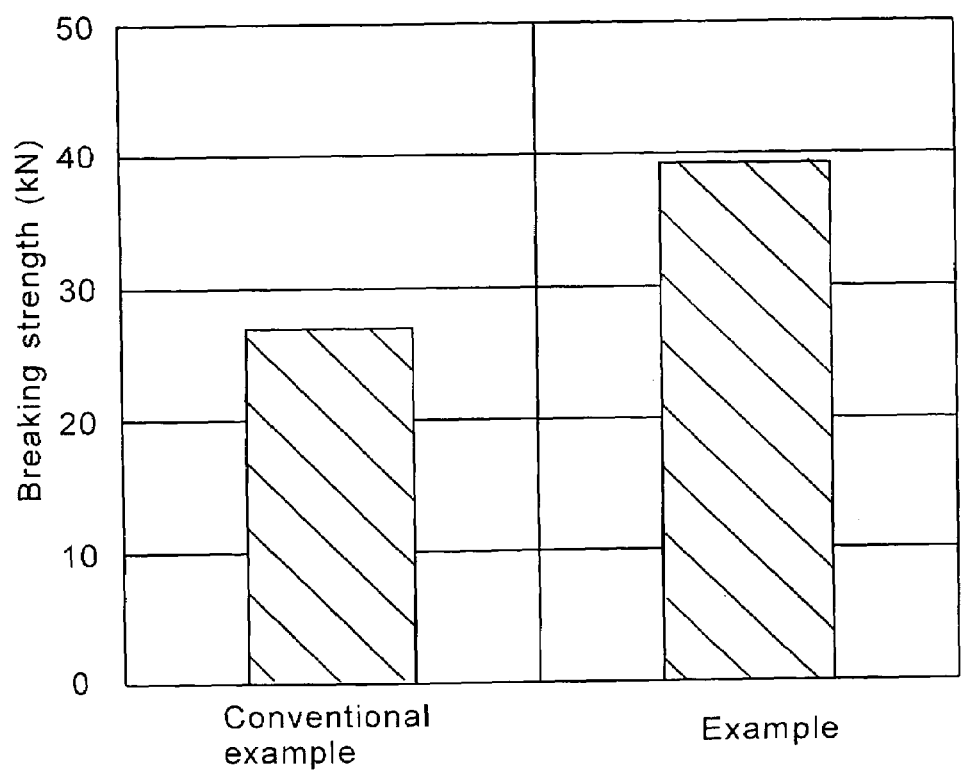
FIG. 3 is a graph showing the results of tests for breaking strength, carried out on a roller chain in accordance with the invention and on a conventional roller chain.
Figure 4:
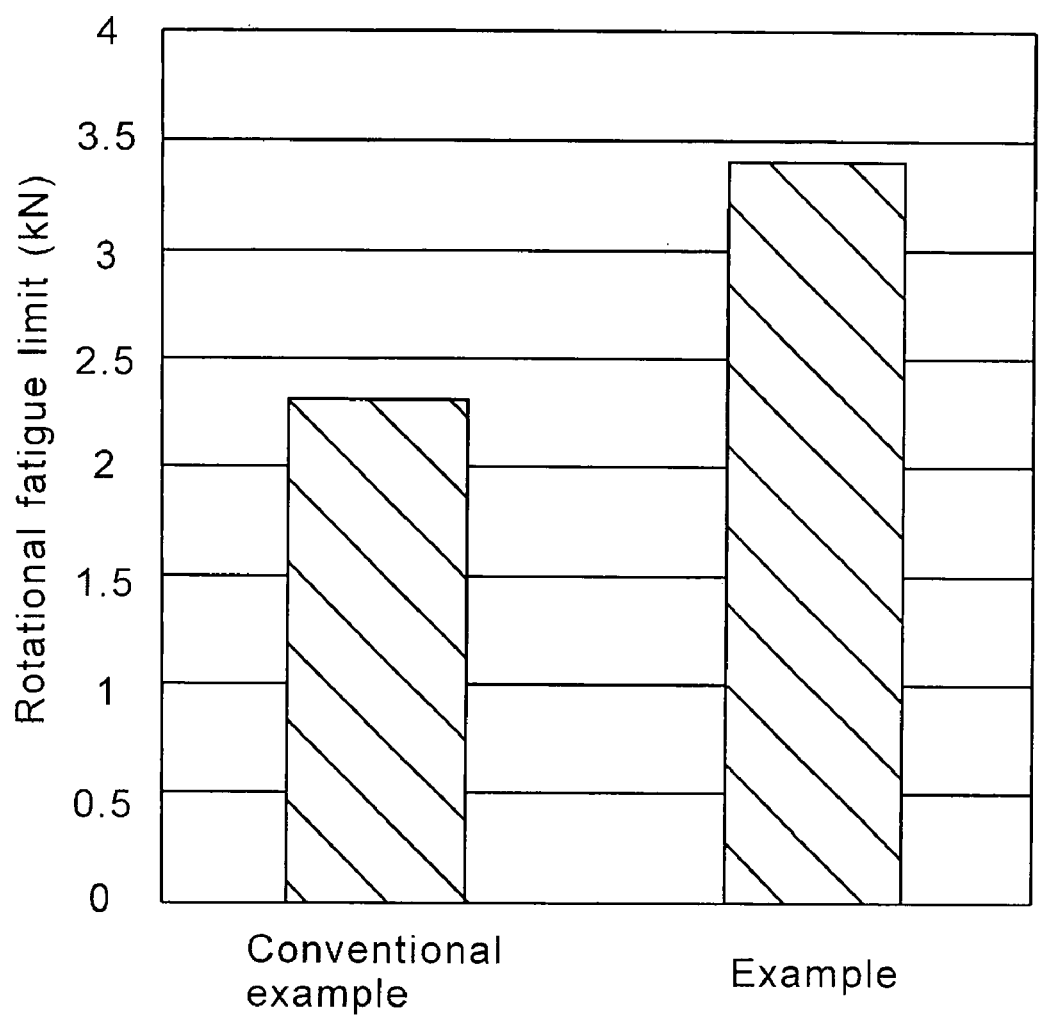
FIG. 4 is a graph showing the results of tests for rotational fatigue limits, carried out on a roller chain in accordance with the invention and on a conventional roller chain.
Figure 5A:
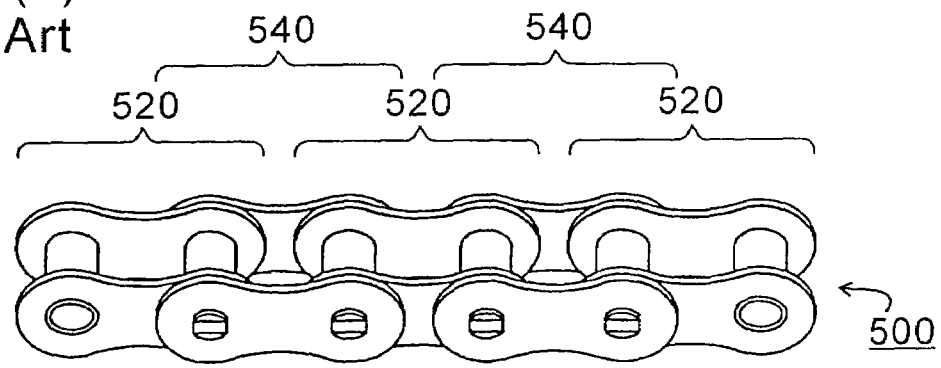
FIGS. 5(a), 5(b) and 5(c) are respectively a perspective view showing several links of a conventional roller chain, an inner link and an outer link.
Figure 5B:
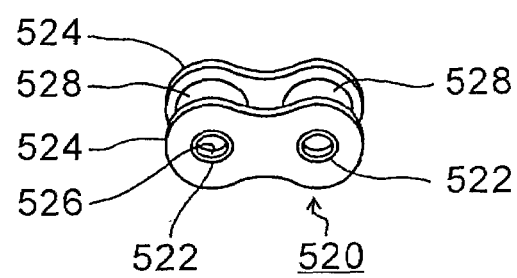
Figure 5C:
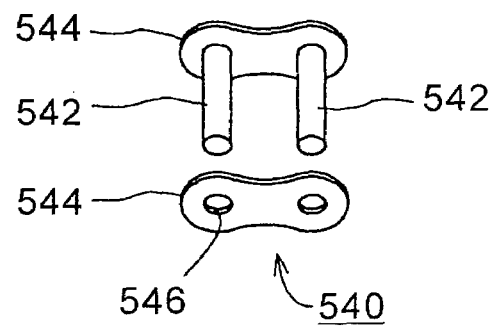

The properties of the roller chain according to the example are illustrated in FIGS. 2–4. In the respective measurements, roller chains used as examples of conventional roller chains were "06 B" roller chains, having a pitch of 9.625 mm, an outside roller diameter of 6.35 mm, an outside pin diameter of 3.28 mm, and an inner plate height of 8.26 mm.

FIG. 2 shows the measured elongation ratios of the roller chains, expressed as percent (%). In the tests, a roller chain having 96 links was wrapped around two sprockets, one having 18 teeth, and the other having 36 teeth. The elongation indices of the chains were measured with the 18 tooth sprocket rotating at 6500 rpm and while maintaining the tension in each chain at 2.0 kN. and the elongation indexes of the chain were measured. In FIG. 2, the solid line shows the measured results for a roller chain according to the above-described example of a chain in accordance with the invention, and the broken line shows the measured results for a conventional roller chain.

As can be seen from FIG. 2, even at 200 hours, the elongation ratio of the roller chain in accordance with the invention was held to about 70% of the elongation of the conventional roller chain. Contact stress between a pin and a bushing was also measured. Contact stress in the roller chain in accordance with the invention was reduced by about 10% as compared with the conventional roller chain. It is believed that the reduction in contact stress is responsible for the suppression of the elongation ratio.

FIG. 3 shows the results of pin breaking strength tests, where the breaking strength is expressed as kN applied to a length of roller chain. A section of roller chain consisting of at least five links was mounted on a tensile machine to measure how much tensile load the pins can endure. As can be seen from FIG. 3, the pin breaking strength in the roller chain in accordance with the invention about 1.5 times the pin breaking strength in the conventional roller chain.

FIG. 4 shows the results of measurements of rotational fatigue limits, in kN, for the two roller chains. The rotational fatigue limit is the load limit at which breakage due to fatigue does not occur after repeated application of the load a prescribed number of times. These tests of rotational fatigue limits were carried out using the method defined in JIS B1801 (revised in 1997).

As shown in FIG. 4, the fatigue limit of the roller chain in accordance with the invention was about 1.5 times greater than the fatigue limit of the conventional roller chain. The remarkable improvement in the fatigue limit is believed to be due to the fact that the height H of the inner plate was set to 96% or more of the pitch P, and the minimum cross-sectional area of the inner plate was increased, so that concentration of stress in this area is avoided.

As mentioned previously, in the example of a roller chain in accordance with the invention, the outside diameter of the roller was 6.25 mm, the outside diameter of the pin was 3.50 mm, the pitch P was 8.00 mm and the height of the inner plate was 7.8 mm. So long as the relationships $0.72P \leq D \leq 0.79P$, $0.40P \leq d \leq 0.44P$, and $0.96P \leq H$ are satisfied, significant improvements in elongation ratio, breaking strength and the rotational fatigue limit can be realized compared with the same properties as exhibited by conventional roller chains.

If the sizes of the sprockets used with the roller chains in accordance with the invention are defined in accordance with a reference size calculating equation, based on the pitch. P of the roller chain and the outside diameter D of the rollers, S-shaped tooth forms, U-shaped tooth forms, and ISO tooth-shaped tooth forms may be used. Thus conventional sprockets can be used. However, the dimensions of the sprocket teeth are decreased in accordance with the increased diameters of the roller in the chain. Thus, from the viewpoint of enhancing the overall reliability of the power transmission mechanism, the material and heat treatment of the sprocket should be chosen appropriately.

As described above, in the roller chain of the invention, the outside diameter of the roller and the outside diameter of the pin satisfy the relationships $0.72P \leq D \leq 0.79P$ and $0.40P \leq d \leq 0.44P$, and, the height H of the inner plate satisfies the relationship $0.96P \leq H$. Thus, the diameter of the pin is increased, and its breaking strength is significantly enhanced. Even if the roller chain of the invention is used as a timing chain of an automobile engine, which is rotated at high speed, the pin does not break as a result of aging. Further, since the minimum cross-sectional area of the inner plate of the chain is increased, stress concentration in the vicinity of the bushings, which are press-fit into the inner links can be avoided, so that the generation of cracks and the like in the inner plate is suppressed.

Additionally, when the diameter of the pin is increased, the contact area between the pin and the bushing is increased and the contact stress on the pin and the bushing is decreased. As a result, the wear of the pin and bushing is suppressed, and the elongation ratio of the chain is reduced, so that the useful life of the chain is increased. When the roller chain according to the invention is used as a timing chain in an automobile, proper timing is ensured over a long period of time. Furthermore, the roller chain provides improved quietness of operation, and contributes to a saving of energy.

In accordance with the invention, the size ratios of the components forming the roller chain are optimized, and the useful life of a chain operated at high speed is significantly improved. The invention is also technically significant in that it allows the durability of a roller chain to be improved in reproducible manner.

What is claimed is:

1. A roller chain comprising: alternately connected and overlapping inner and outer links, in which each inner link comprises a pair of opposed inner plates, each inner plate having a pair of bushing holes, and a pair of bushings, each bushing being fixed in one bushing hole of one of said inner plates and in one bushing hole of the other of said inner plates;

each outer link comprises a pair of opposed outer plates, each outer plate having a pair of pin holes, and a pair of pins, each pin being fixed in one pin hole of one of said outer plates and in one pin hole of the other of said outer plates; and the outer plates of each outer link are disposed in overlapping relation with, and on the outsides of, inner plates of adjacent inner links, and each pin of an outer link extends through, and is rotatable in, a bushing of an adjacent inner link;

and a roller rotatably disposed on each said bushing;

wherein:

the outside diameter D of said roller and the outside diameter d of said pin satisfy the relationships $0.72P \leq D \leq 0.79P$ and $0.40P \leq d \leq 0.44P$ where P is the pitch of the roller chain; and the height H of the inner plates satisfies the relationship $0.96P \leq H$.

* * * * *